(12) United States Patent
Nelson et al.

(10) Patent No.: US 8,590,112 B2
(45) Date of Patent: Nov. 26, 2013

(54) CABLE TIE

(75) Inventors: Daniel J. Nelson, Edgewater, CO (US);
Douglas John Ingalls, Bailey, CO (US);
Matthew D. Bush, Evergreen, CO (US)

(73) Assignee: Band-It-IDEX, Inc., Denver, CO (US)

( * ) Notice: Subject to any disclaimer, the term of this patent is extended or adjusted under 35 U.S.C. 154(b) by 368 days.

(21) Appl. No.: 12/628,943

(22) Filed: Dec. 1, 2009

(65) Prior Publication Data
US 2011/0126381 A1 Jun. 2, 2011

(51) Int. Cl.
*B65D 63/02* (2006.01)

(52) U.S. Cl.
USPC ............................................. 24/20 R

(58) Field of Classification Search
None
See application file for complete search history.

(56) References Cited

U.S. PATENT DOCUMENTS

| | | |
|---|---|---|
| 62,777 A | 3/1867 | Ricker |
| 100,897 A | 3/1870 | Hunt |
| 157,032 A | 8/1874 | Smith |
| 163,380 A | 5/1875 | Jordan |
| 356,083 A | 1/1887 | Schrader |
| 1,022,462 A | 4/1912 | Brink |
| 1,209,119 A | 12/1916 | Childress |
| 1,718,291 A | 6/1929 | Guenther |
| 2,021,701 A | 11/1935 | Smith |
| 2,163,048 A | 6/1939 | McKee |
| 2,192,979 A | 3/1940 | McAneny, Jr. |
| 2,338,629 A | 1/1944 | Felder et al. |
| 2,455,760 A | 12/1948 | Gustafson |
| 2,870,503 A | 1/1959 | McAneny |
| 3,155,355 A | 11/1964 | Cappola |
| 3,261,062 A | 7/1966 | Scarborough, Jr. |
| 3,660,869 A | 5/1972 | Caveney et al. |
| 3,892,011 A | 7/1975 | Kohke |
| 4,222,155 A | 9/1980 | Oetiker |
| 4,262,406 A | 4/1981 | Fredrickson et al. |
| 4,272,870 A | 6/1981 | McCormick |
| 4,333,210 A | 6/1982 | Burnett |

(Continued)

FOREIGN PATENT DOCUMENTS

| | | |
|---|---|---|
| GB | 571978 | 9/1945 |
| GB | 1032303 | 6/1966 |

OTHER PUBLICATIONS

International Search Report for International (PCT) Application No. PCT/US10/57215, mailed Jan. 7, 2011.

(Continued)

*Primary Examiner* — Jack W. Lavinder
(74) *Attorney, Agent, or Firm* — Sheridan Ross P.C.

(57) ABSTRACT

A cable tie having a head for receiving a tail for binding various objects is provided wherein a head of an integral buckle is tilted so that the tail portion is more easily received. By employing a tilted head, of preferably 30 degrees, a 15-20% increase in performance over similar cables ties of the prior art has been achieve. In addition, a cable tie is provided that includes a bulged or coined portion. A leading edge of the band that is associated with the buckle also includes a bulged or coined portion. The bulged portions are preferably created by a coining process and facilitate binding mechanically the band to the buckle. In addition, a cable tie is provided wherein a head of the integral buckle is interconnected to the band via angled side walls. The angled side walls increase an opening in the buckle that receives the band such that during tensioning less energy is needed to tension the cable tie around a bundle of cables, for example.

9 Claims, 18 Drawing Sheets

(56) References Cited

U.S. PATENT DOCUMENTS

| | | | |
|---|---|---|---|
| 4,507,828 | A | 4/1985 | Furutsu |
| 4,631,782 | A | 12/1986 | Gecs |
| 4,646,393 | A | 3/1987 | Young |
| 4,875,647 | A | 10/1989 | Takagi et al. |
| 4,896,402 | A | 1/1990 | Jansen et al. |
| 5,210,910 | A | 5/1993 | Hellwig |
| 5,303,571 | A | 4/1994 | Quinn et al. |
| 5,452,523 | A | 9/1995 | Jansen |
| 5,743,310 | A | 4/1998 | Moran |
| 5,745,957 | A | 5/1998 | Khokhar et al. |
| 5,832,567 | A | 11/1998 | Edwards et al. |
| 5,850,674 | A | 12/1998 | Jansen |
| 5,890,265 | A | 4/1999 | Christian et al. |
| 5,911,367 | A * | 6/1999 | McInerney .................. 24/16 PB |
| 6,014,792 | A | 1/2000 | Marelin et al. |
| 6,076,234 | A | 6/2000 | Khokhar et al. |
| 6,928,701 | B2 | 8/2005 | Hutter, III |
| 6,938,305 | B2 | 9/2005 | Garver |
| 2003/0154574 | A1 * | 8/2003 | Hatch .......................... 24/16 PB |
| 2004/0088832 | A1 | 5/2004 | Groves |
| 2007/0023586 | A1 | 2/2007 | Geiger |
| 2007/0056145 | A1 | 3/2007 | Stillings et al. |
| 2012/0233818 | A1 | 9/2012 | Newth et al. |

OTHER PUBLICATIONS

Written Opinion for International (PCT) Application No. PCT/US10/57215, mailed Jan. 7, 2011.

U.S. Appl. No. 13/237,338, filed Sep. 20, 2011, Daley et al.

International Preliminary Report on Patentability for International (PCT) Application No. PCT/US10/57215, mailed Jun. 14, 2012.

Official Action for Canadian Patent Application No. 2,786,138 dated Apr. 10, 2013, 2 pages.

* cited by examiner

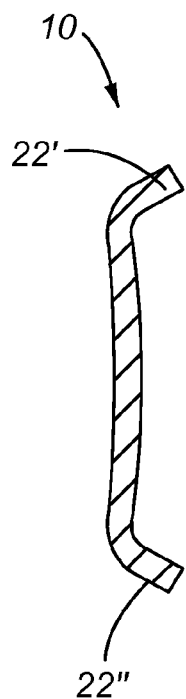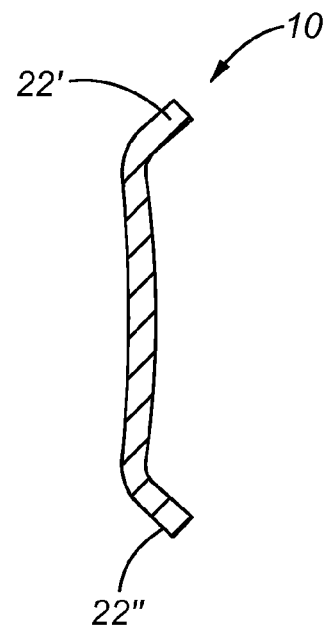
Fig. 25  Fig. 26
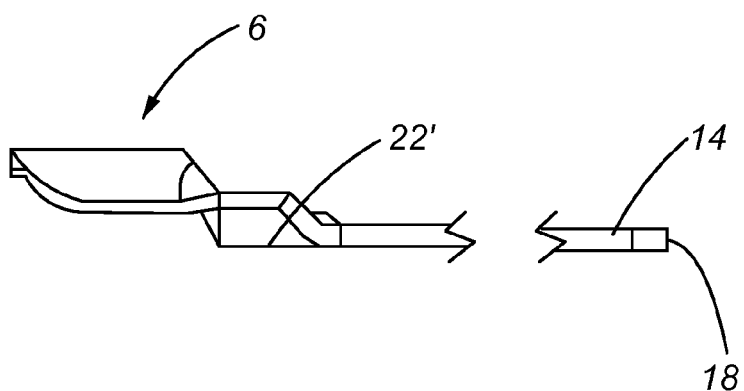
Fig. 27

CABLE TIE

CROSS REFERENCE TO RELATED APPLICATIONS

This application is related to abandoned U.S. Provisional Patent Application No. 60/982,905, filed Oct. 26, 2007, entitled "Cable Tie with Rotated Buckle"; abandoned U.S. Provisional Patent Application No. 61/028,829, filed Feb. 14, 2008, entitled "Cable Tie with Coined Buckle"; and abandoned U.S. Provisional Patent Application No. 61/028,839, filed Feb. 14, 2008, entitled "Cable Tie with Angled Side Walls", the entire disclosures of which are incorporated by reference herein. This application is also related to issued U.S. Pat. No. 4,896,402, which stemmed from U.S. patent application Ser. No. 07/279,576, filed on Dec. 2, 1988, which is a Continuation-in-Part of abandoned U.S. patent application Ser. No. 07/152,909, filed Feb. 5, 1988, the entire disclosures of which are incorporated by reference herein.

FIELD OF THE INVENTION

The present invention relates to a fastening or clamping device and, in particular, to a tie for constraining cables or the like.

BACKGROUND OF THE INVENTION

A number of fastening or clamping devices have been devised for a variety of purposes. These devices generally comprise a band with interconnected buckle which receives a free end of the band. In one application, clamps are used to connect electric shielding or insulation about electric wires. In other applications, fastening or clamping devices are used to bundle a plurality of cables, wires, or other items, together. U.S. Pat. No. 4,646,393 to Young ("Young"), for example, discloses a one-piece cable tie comprised of a band and interconnected buckle. The buckle is generally in the form of a longitudinally extending opening. The free end, or tail, of the band is inserted through the opening provided by the buckle and affixed thereto after tension is applied to the band.

Other one-piece cable ties are illustrated in U.S. Pat. No. 356,083 to Schrader, et al., ("Schrader") and U.S. Pat. No. 157,032 to Smith ("Smith"). Schrader discloses a hose clamp that includes a number of projections that are folded to provide a buckle or catch for securing the band. Smith discloses a band with integral wings that are bent over to engage portions of the band to secure it in place. A one-piece cable tie is also described in U.S. Pat. No. 3,660,869 to Caveney, et al. ("Caveney"). The Caveney cable tie employs a row of teeth disposed on one longitudinal surface by the band that interacts with a pawl on the buckle. One-piece cable ties similar to that disclosed in Caveney are described in U.S. Pat. No. 4,272,870 to McCormick ("McCormick") and U.S. Pat. No. 4,507,828 to Furutsu ("Furutsu"). The cable tie of McCormick employs serrated teeth disposed on one longitudinal surface of the band that engage complementary teeth disposed on the interior of the upper surface of the buckle. In contrast, attachment of the band and buckle of Furutsu is accomplished by engagement of the serrated teeth with a single, ratchet-like tooth disposed on the interior of the lower surface of the buckle.

Although cable ties and associated buckles are generally known, it is desirable to improve the characteristics thereof. More specifically, it is desirable to provide a one-piece cable tie that provides improved retention force, and/or clamping force. It is also desirous to provide a band that possesses these qualities even when very small objects are bound. Further, it has been a goal to produce such cable tie that can be made relatively inexpensively with reduced material waste and can be readily fastened about a hose, cable, or other item. Similarly, it remains desirable to provide a one-piece cable tie that exhibits these improved engagement or securement characteristics between the band and the buckle. More specifically, there exists a need for a one-piece cable tie that promotes locking engagement of band to the buckle, enhances insertion of the band into the buckle and provides increased performance.

SUMMARY OF THE INVENTION

A one-piece cable tie is provided by embodiments of the present invention that includes a band or strap (hereinafter "band") and a buckle, a clasp, a clamp, a seal or a catch (hereinafter "buckle") integrally formed at one end of the band. The band includes a free end, or "tail" that interfaces with the buckle wherein a majority of the band forms a loop about an electrical cable or the like. The opposite or "leading" end of the band is associated with the buckle. The buckle comprises a head that is spaced from the leading end of the band by sidewalls to define an opening that receives the tail of the band. The side walls define the side edges of the opening. The leading edge cooperates with the head to engage a portion of the band that is positioned within the opening.

The cable tie of embodiments of the present invention preferably are used to attach an electrical cable, shielding or the like to a connector. In a first method of attachment the band is initially disposed about the object(s) to be constrained and then the tail of the band is inserted through the opening. With the buckle being held in place, the tail of the band is drawn or pulled away from the buckle, thereby tightening the band about the object. Once the band is tensioned about the object, the band is fixed (i.e., "locked") relative to the buckle. Preferably, locking is achieved by bending a portion of the band around the head of the buckle and trimming the excess. In a second method of connection the band is passed about the object multiple times and is then tensioned. The band is also preferably deformed (i.e., hooked)about the buckle which helps prevent movement of the band relative to the buckle.

The buckle configuration of embodiments of the present invention generally reduces a gap often present between the band and the object bound by the band. The gap affects the amount of applied and maintained tension and can be attributed to the length and rigidity of the buckle used. More specifically, for an object having a given diameter there is a direct correlation between the length of rigid buckle material adjacent the object being constrained and the size of the gap. The greater the buckle length that is positioned adjacent the object of a given diameter, the greater the resulting gap when the band is secured. Consequently, it is desirable to reduce or minimize the length of the rigid buckle material that is placed adjacent the objects being bound. Similarly, for a buckle having a given length of rigid material adjacent an object there is an inverse relationship between the size of the gap and the diameter of the object that can be effectively constrained. From the foregoing it will be appreciated by those of skill in the art that by reducing or minimizing the length of the rigid buckle material adjacent the object, the gap between the band and the object when the band is locked in place will be similarly reduced. Thus, embodiments of the present invention position only the leading edge of the band adjacent to the object, thereby reducing or generally eliminating any gap between the band and the object. In addition, the buckle of the present invention facilitates insertion of the tail into the opening by longitudinally separating the trailing edge of the head from the leading edge of the band. The separation provides an ample opening for receipt of the tail. Consequently, enlarged opening reduces interactions as the band is tensioned within the buckle.

In a related embodiment of the present invention, insertion of the tail into the opening is enhanced by tilting the head relative to the band. A tilted head increases the area of the opening which facilitates insertion of the tail and tensioning of the band. That is, contact between the band and the buckle is reduced or eliminated and less energy is then needed to tension the band. In addition, the tilted head reduces the aforementioned gap, thereby increasing the amount of tension force that can be applied by providing a tensioned cable tie that generally coincides with the contour or of the object being bundled. The head may be tilted downward (i.e., toward the objects being bundled) about 0-50 degrees. Preferably, one embodiment of the present invention employs a head that is tilted 30 degrees. A head having a tilt angle of about 30 degrees provides a 15-20% performance increase over the cable ties without such a tilt angle. Studies have also shown a head tilted about 40 degrees is optimum with respect to reduction in tightening friction and increase of retention force achieved.

It is yet another aspect of the present invention to provide a cable tie that reduces performance variations. More specifically, it has been found, as will be described in further detail below, that by tilting the head, the repeatability of maximum clamping force, tensile force, and retention force, is enhanced.

It is another aspect of the present invention to provide a cable tie with enhanced locking characteristics. More specifically, embodiments of the present invention employ a unique method of shaping the head and the leading edge of the band to facilitate interconnection between the band and the buckle. More specifically, a "coining" process is employed to plastically deform the trailing edge of the head and the leading edge of the band to move material longitudinally (i.e., along the length of the band). Coining creates a thinned area of material, similar to a knife edge, that protrudes into the band as a result of the tightening process subsequent to tensioning thereof. As one skilled in the art will appreciate, coining is a form of stamping wherein pressure causes plastic flow of the surface of the material. In one embodiment, the trailing edge of the head is deformed towards the leading edge of the band and the leading edge of the band is deformed towards the head. It is contemplated that the coining process be performed after the buckle and interconnected to the band is stamped from a single sheet of material. Conversely, coining may be performed concurrently stamping wherein additional pressure is added to the leading edge of the band and the trailing edge of the head.

It is another aspect of the present invention to provide a cable tie with friction reducing characteristics. More specifically, one embodiment is provided that employs sidewalls that are angled outwardly with respect to the longitudinal axis of the band. The resulting opening includes a widened opening that allows the tail end of the band to slip easily therethrough without the lateral edges of the band substantially contacting the side walls. As a result, the amount of retention force needed to tension the cable tie is reduced. The reduction of retention force is directly related to a reduction of energy needed to tension the band, thereby rendering the band easier to tension manually or by machine.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects and advantages of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these invention.

FIG. 25 is a cross-sectional view taken along line 25-25 of FIG. 24;

FIG. 26 is a cross-sectional view taken along line 26-26 of FIG. 24;

FIG. 27 is a front elevation view of the cable tie shown in FIG. 24;

Figure 1:
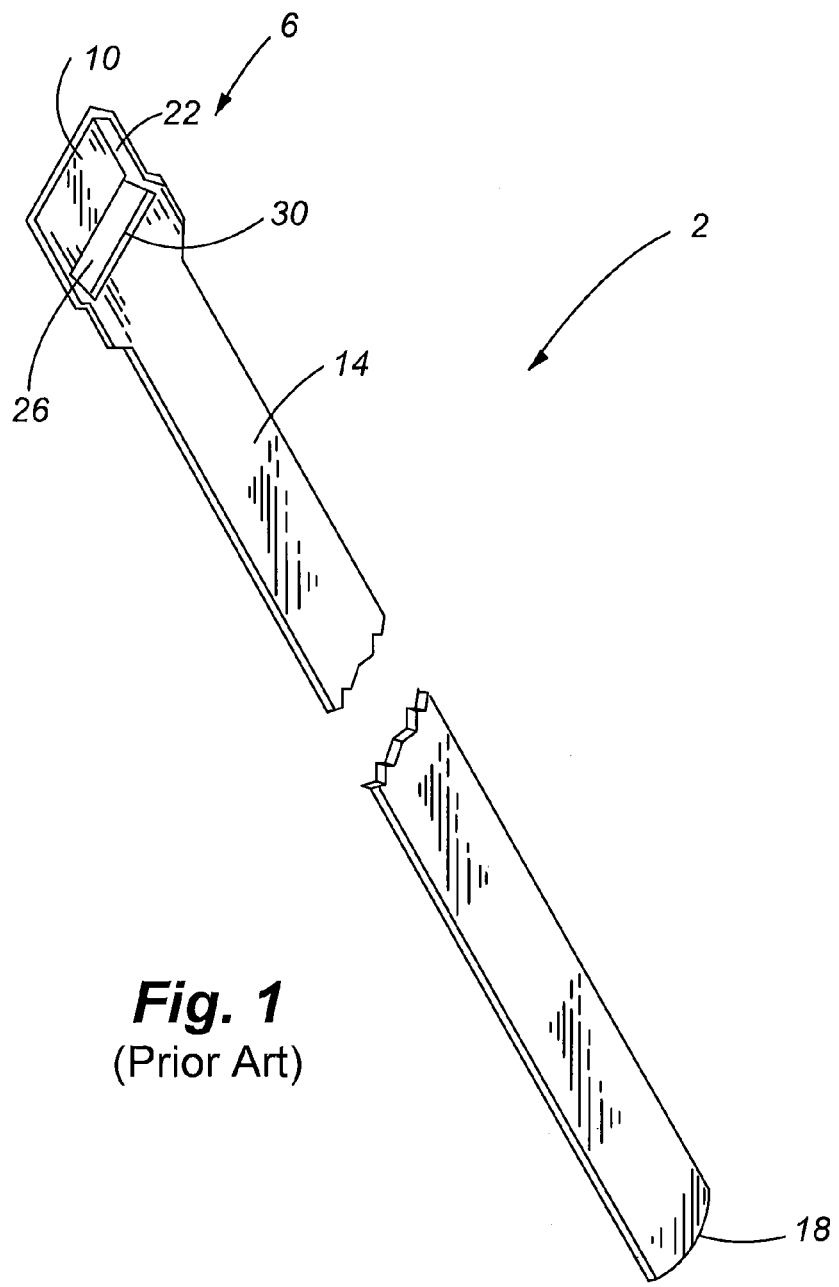
FIG. 1 is a bottom perspective view of a cable tie of the prior art.
Figure 2:
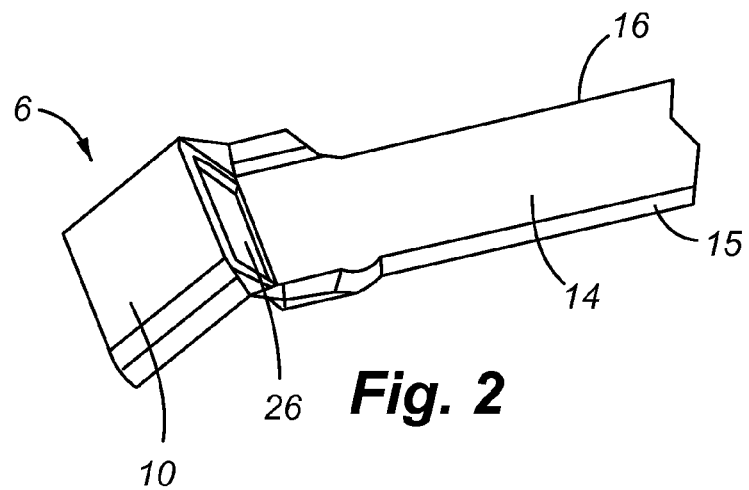
FIG. 2 is a partial front perspective view of a cable tie of one embodiment of the present invention wherein the buckle is angled with respect to a band.
Figure 3:
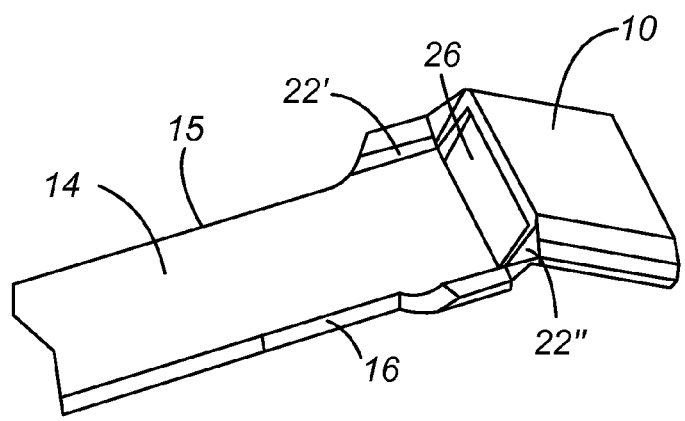
FIG. 3 is a partial rear perspective view of the cable tie shown in FIG. 2.
Figure 4:
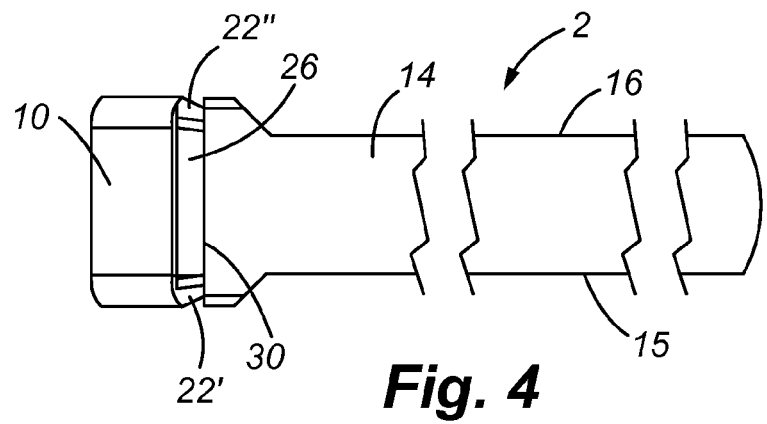
FIG. 4 is a top plan view of the cable tie shown in FIG. 2.
Figure 6:
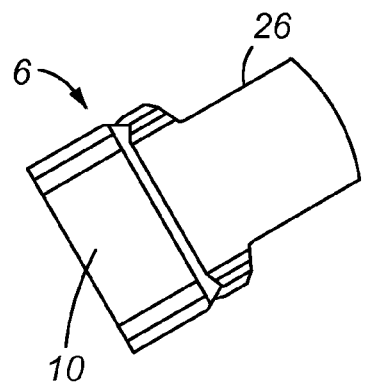
FIG. 6 is an auxiliary view of the cable tie shown in FIG. 5.
Figure 5:
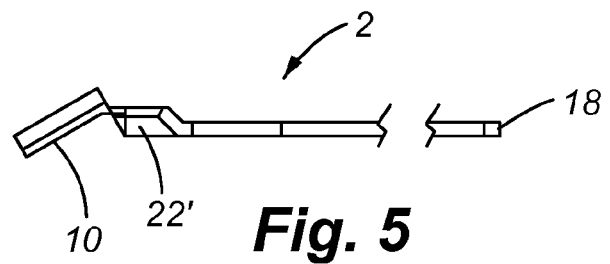
FIG. 5 is a front elevation view of the cable tie shown in FIG. 2.
Figure 7:
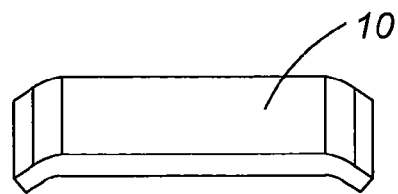
FIG. 7 is a left elevation view of the cable tie shown in FIG. 5.
Figure 8:
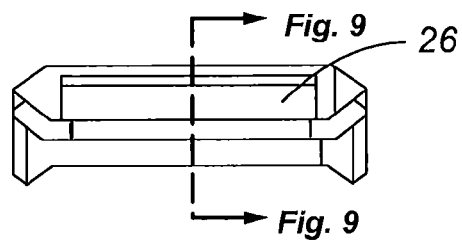
FIG. 8 is a right elevation view of the cable tie shown in FIG. 5.
Figure 9:
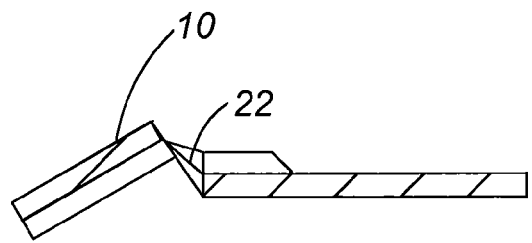
FIG. 9 is a cross-sectional view taken along line 9-9 of FIG. 8.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 2-13, one embodiment of a cable tie 2 having a buckle 6 that includes a tilted head 10 is shown. Generally, the cable tie 2 of embodiments of the present invention consists of a band 14, which has a first edge 15 and a second edge 16, that terminates at a tail 18 at one end and that is interconnected to the buckle 6 at the opposite end. The buckle 6 includes the head 10 that is spaced from the band portion 14 and interconnected to the band 14 via side walls 22, which comprise a first side wall 22' and a second side wall 22". For purposes of manufacturability, a small band segment may be attached to the side walls 22 and extend outwardly therefrom. The band segment is connected to the band 14 to form the cable tie 2. It should be appreciated that the buckle 6 may also be attached to the band by other methods known to those of skill in the art. An opening 26 is defined by a leading edge 30 of the band 14 and a trailing edge 32 of the head 10. After the tail 18 is threaded through the opening 26 in the head 10, the band 14 is tensioned around a cable 34, or one or more other objects. Subsequent to tensioning, an outer surface of the band 14 will be deformed about the trailing edge 32 of the head 10 which helps maintain the tension of the cable tie 2. Once the desired tension is achieved, the band is cut to remove excess.

The head 10 is rotated or tilted relative to the plane of the band, preferably about 30 degrees, thereby increasing the size of the opening 26 and allowing the tail 18 to be more easily threaded therethrough. The increase of opening area reduce contact and decreases friction between the band 14 and the buckle 6 when the band portion is threaded therethrough, which helps reduce the energy needed for clamping. The head rotation provides about 15 to 20% increase in performance over the band described in the above-described references.

Figure 10:
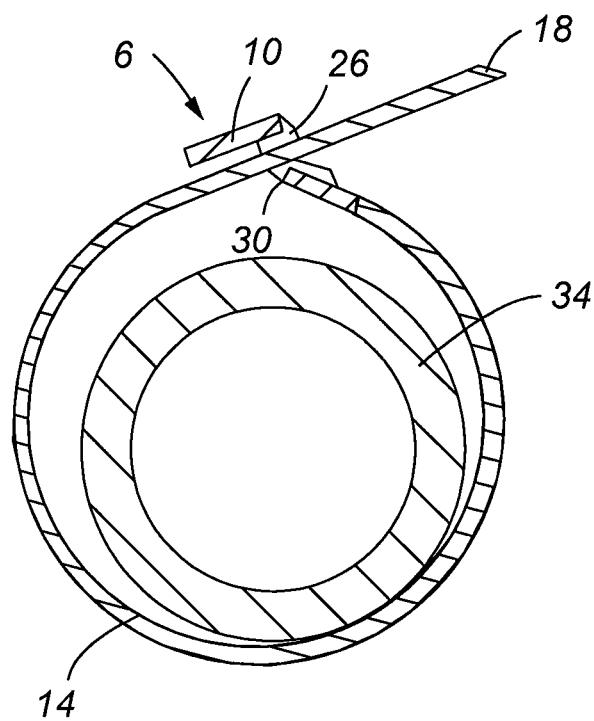
FIG. 10 is a cross-sectional view of the cable tie of FIG. 2 shown prior to tensioning around an object.
Figure 11:
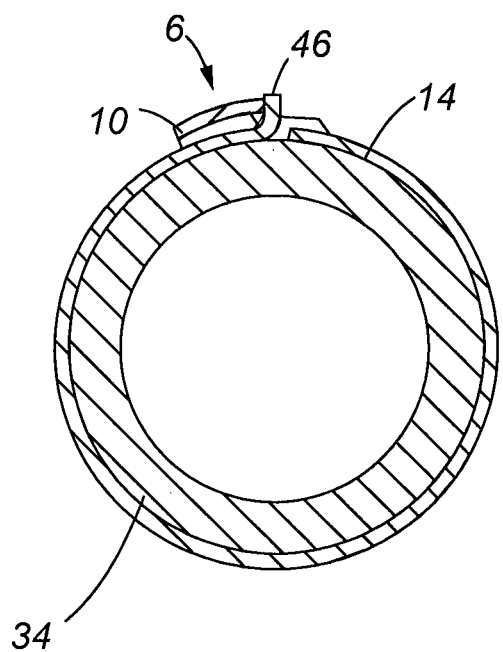
FIG. 11 is a sectional view of the cable tie of FIG. 2 subsequent to tensioning around an object.
Figure 12:
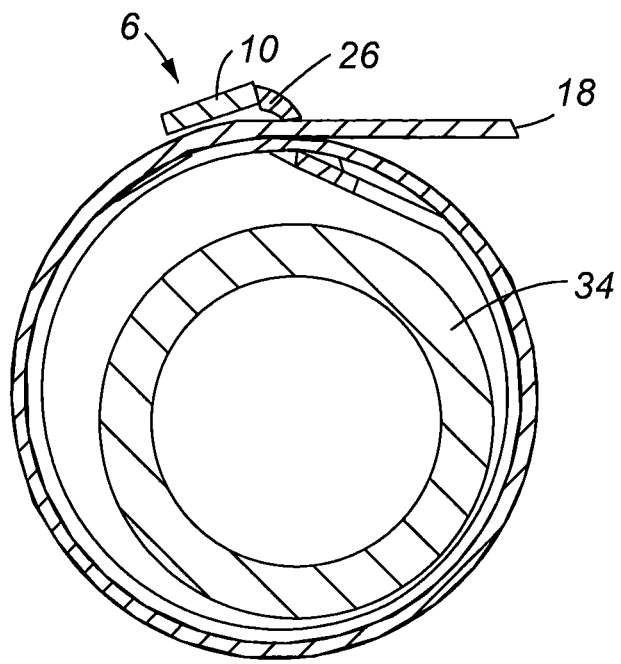
FIG. 12 is a cross-sectional view of the cable tie of FIG. 2 shown in a second mode of use prior to tensioning around an object.
Figure 13:
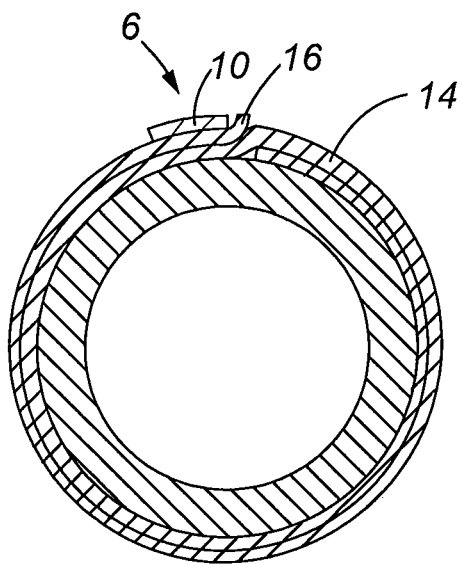
FIG. 13 is a cross-sectional view of the cable tie of FIG. 2 subsequent to tensioning around an object.
Figure 14:
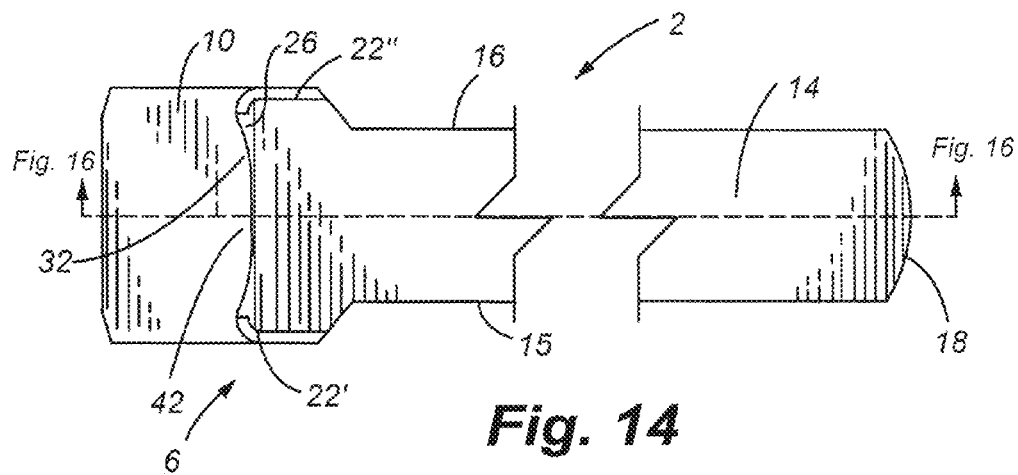
FIG. 14 a top plan view of a cable tie of another embodiment of the present invention that employs a coined buckle.
Figure 15:
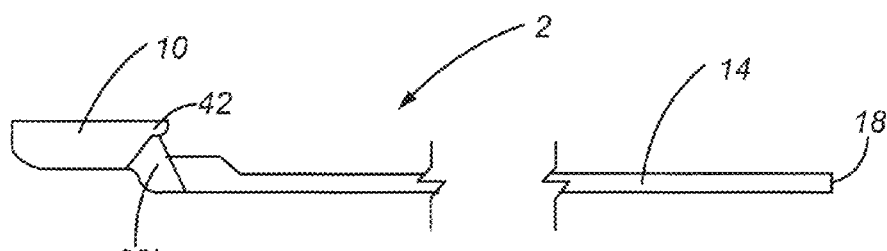
FIG. 15 is a front elevation view of the cable tie shown in FIG. 14.
Figure 16:
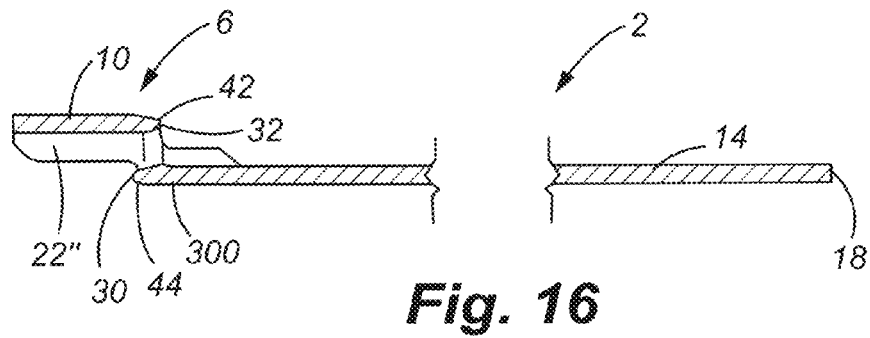
FIG. 16 is a cross sectional view of the cable tie shown in FIG. 14.

FIGS. 10-13 show the band 14 is wrapped around a cable 34, although it should be understood that the "cable" could also be a bundle of cables, a tube, or one or more other objects. As illustrated the tail 18 of the band is threaded through the buckle 6 one or more times (FIGS. 10 and 12). After tensioning (FIGS. 11 and 13), a tool bends the band 14 upwardly and the head 10 downwardly. The excess portion of the band is severed 46, thereby securing the cable tie about the cable 34 or other object. The angled configuration of the head 10 reduces the gap between the buckle 6 and the object 34.

Referring now specifically to FIGS. 14-20, a coined cable tie 2 is shown, wherein a bulge 42 is formed in the head and a bulge 44 is formed in the band. The bulge 42 may comprise an arcuate shape. The bulge 44 may comprise an arcuate shape. More specifically, embodiments of the present invention employ a forming step that deforms the trailing edge 32 of the head 10 and the leading edge 30 of the band 14 along the axis of the band, which alters the shape of the opening 26. It is contemplated that a die is used to compress the trailing edge 32 of the head 10 to move it towards the leading edge 30 of the band 14. In addition, a separate or identical die is employed to move material from the leading edge 30 of the band towards the head 10. This process deformation creates a bulge 42 in the head 10 and a bulge 44 in the leading edge 30 of the band. The trailing edge 32 of the head and the leading edge 30 of the band will thus be thinner than the pre-formed thickness of head 10 and the band 30. The coining process increases engagement between the band 14 and the bulges 42, 44, which enhances locking performance. That is, the sharper edges associated with the thinned material of the band and buckle will impinge upon and engage the band 14 more securely compared to non-thinned edges 30 and 32, thereby enhancing the mechanical bond between the band 14 and the buckle 6 by helping to prevent relaxation of the connection. This feature increases the amount of maximum clamping force the band can achieve.

One skilled in the art will appreciate that the coining process may also deflect the sidewalls 22 of the cable tie 2 outwardly, thereby increasing the lateral dimension of the opening 26, (perpendicular to the longitudinal axis of the band 14) wherein movement of the band 14 through the opening 26 is facilitated as described above. The widening of the opening 26 reduces friction during tensioning which equates to more efficient tension of the cable tie 2.

Figure 17:
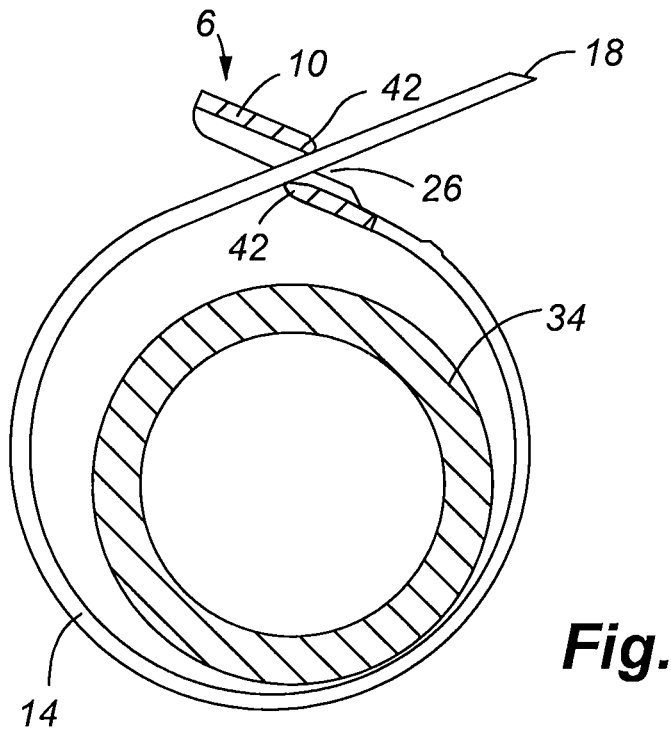
FIG. 17 is a cross-sectional view of the cable tie of FIG. 14 shown prior to tensioning around an object.
Figure 18:
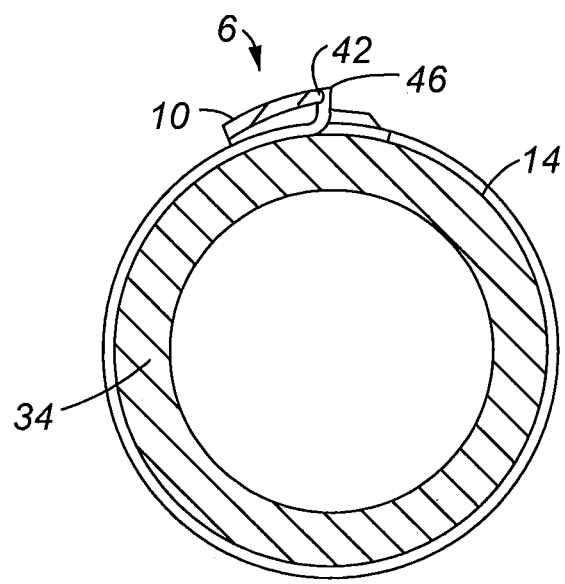
FIG. 18 is a sectional view of the cable tie of FIG. 14 subsequent to tensioning around an object.
Figure 19:
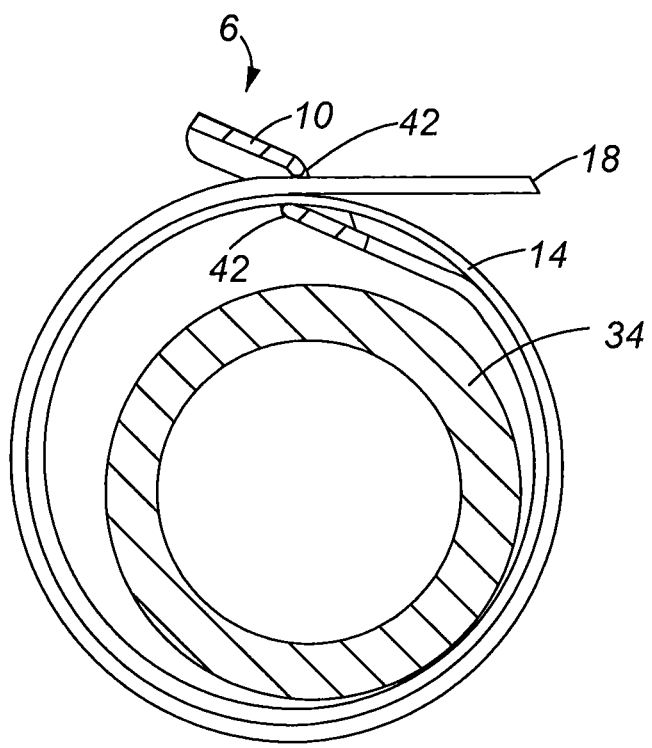
FIG. 19 is a cross-sectional view of the cable tie of FIG. 14 shown in a second mode of use prior to tensioning around an object.
Figure 20:
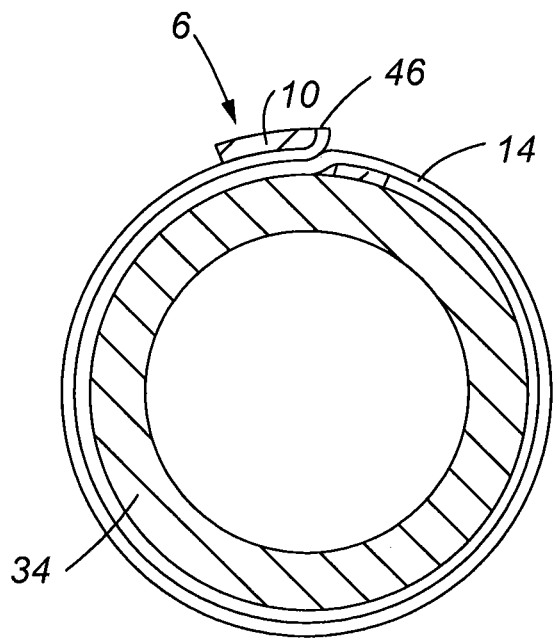
FIG. 20 is a cross-sectional view of the cable tie of FIG. 14 subsequent to tensioning around an object.

FIGS. 17-20 show the band 14 is wrapped around a cable 34, although it should be understood that the "cable" could also be a bundle of cables, a tube, or one or more other objects. As illustrated the tail 18 of the band is threaded through the buckle 6 one or more times (FIGS. 17 and 19). After tensioning (FIGS. 18 and 20), a tool bends the band 14 upwardly and the head 10 downwardly. The excess portion of the band is severed 46, thereby securing the cable tie about the cable 34 or other object. The angled configuration of the head 10 reduces the gap between the buckle 6 and the object 34.

Figure 21:
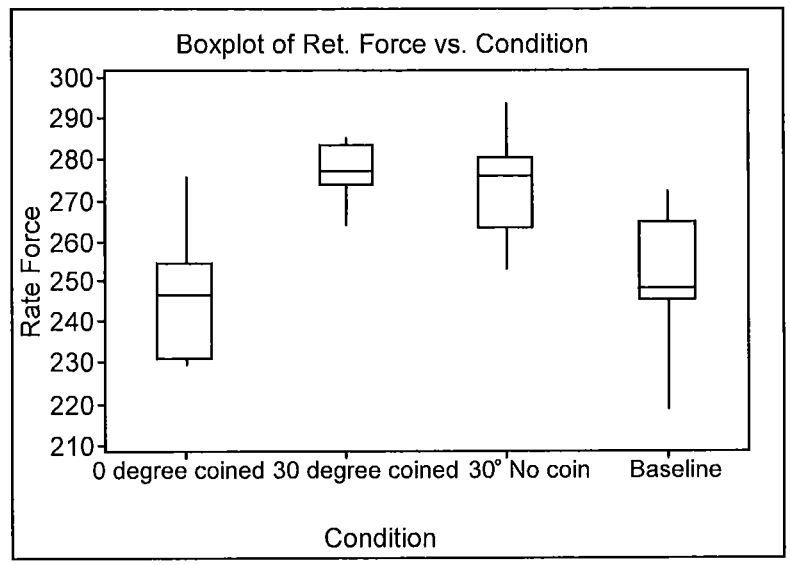
FIG. 21 is a plot illustrating retention force provided by embodiments of the present invention.

Referring now to FIG. 21, a plot of retention force of a cable tie having a head with an about 30 degree bend in comparison with a cable tie of the prior art (i.e., "baseline") is provided. "Retention force" is defined herein as the hoop stress applied about a bundle. Here a cable tie having a head with an about 30 degree bend provides a range of retention force from about 263 to 280 lbs. wherein 275 lbs. is generally achieved. Conversely, the prior art cable ties provide about 242 to 265 lbs. of retention force, wherein 249 lbs. is generally achieved. Thus the variability of a band having a head with a 30 degree bend is about 18 lbs. and the variability of a band having no bend is about 19 lbs. This decrease in variability is desirable.

FIG. 21 also shows retention force of a coined cable tie in comparison with a cable of the prior art. The coined cable tie has a range of retention force from about 230 to 255 lbs. wherein 248 lbs. is generally achieved. Here, the variability of a coined band having coined is about 25 lbs. greater than that of the 19 lbs. achieved by the baseline band. Although performance of this band configuration provides less retention force than the band of the prior art, the coined cable tie reduces friction during tensioning.

FIG. 21 also includes data related to a cable tie that includes an angled head that is also coined. In one embodiment such a cable tie has a range of retention force from about 274 to 284 lbs. wherein 275 lbs. is generally achieved. Here, the variability of a band having a both a 30 degree bend and coined is 10 lbs. which is less than that of the prior art.

Figure 22:
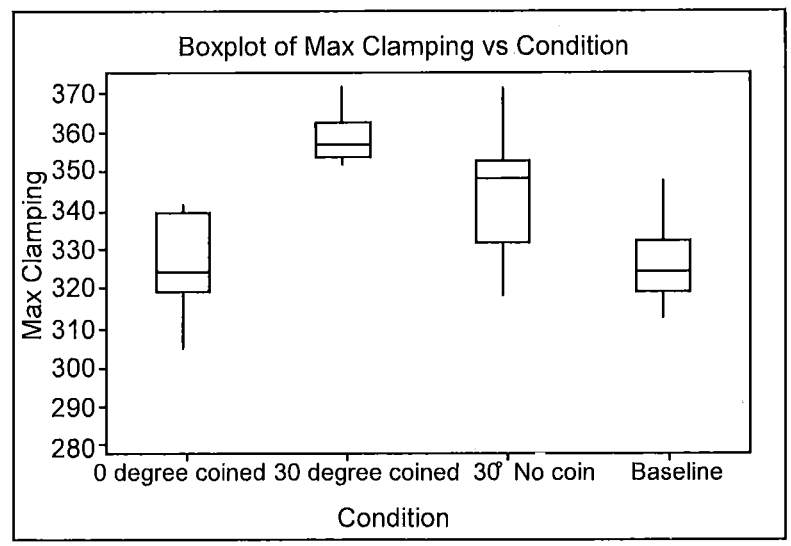
FIG. 22 is a plot of maximum clamping force provided by embodiments of the present invention.

Referring now to FIG. 22, a plot showing the maximum clamping force of a cable tie having an about 30 degree bend in comparison with a prior art cable tie is shown. Maximum clamping force in the range of about 330-352 lbs. is achieved by the cable tie of embodiments of the present invention having a rotated head. Conversely, the prior art cable tie with no rotation generally achieves a maximum clamping force in the range of about 318-331 lbs.

FIG. 22 also includes data related to the maximum clamping force of a coined cable tie compared with a prior art cable tie. A coined cable tie of embodiments of the present invention can achieve a maximum clamping force in the range of 318-340 lbs., which is greater than that of the prior art.

FIG. 22 also includes data related to the maximum clamping force of a cable tie that is coined and that employs an angled head. Such a cable tie provides a maximum clamping force in the range of 353-362 lbs. This configuration also has a decrease in variability.

Figure 23:
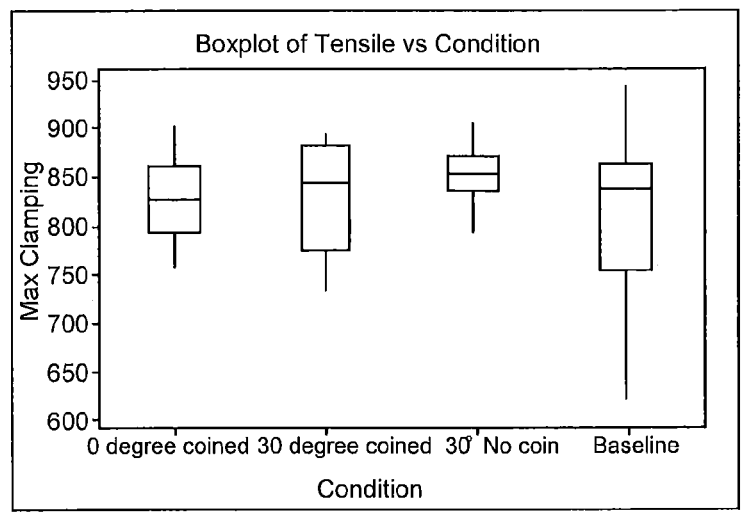
FIG. 23 is a plot of tensile force provided by embodiments of the present invention.
Figure 24:
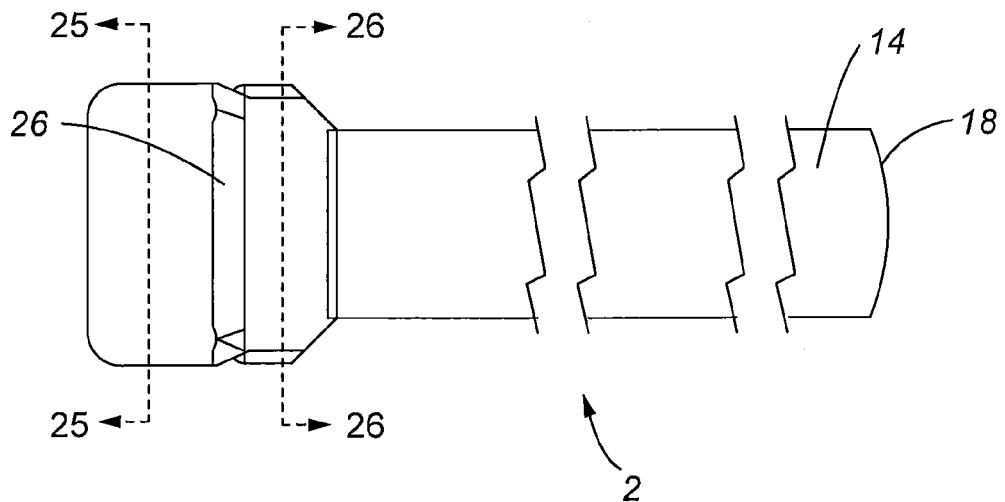
FIG. 24 is a top plan view of the cable tie of another embodiment of the present invention that employs angled sidewalls.
Figure 28:
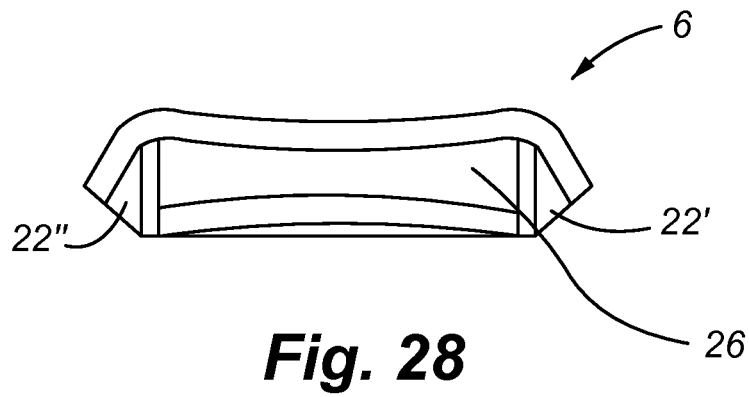
FIG. 28 is a left elevation view of FIG. 27.
Figure 29:
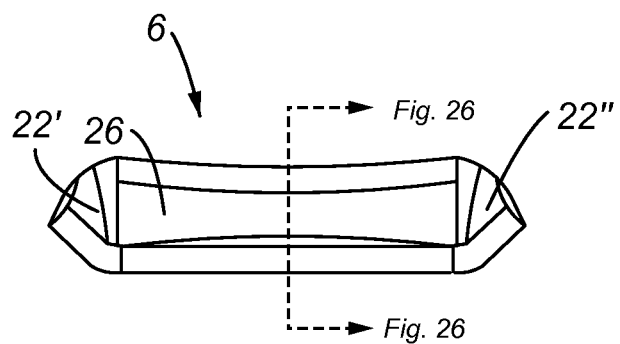
FIG. 29 is a right elevation view of FIG. 27.
Figure 30:
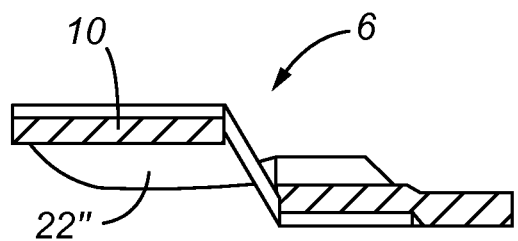
FIG. 30 is a cross-sectional view of FIG. 29.

Referring now to FIG. 23, a plot showing tensile stress of a band having a head with an about 30 degree bend compared to the prior art is provided. Here, the achieved tensile stress in a cable tie having an about 30 degree rotation is about 850 psi with a range of about 840 to 875 psi. The prior art provides slightly less tensile stress, of about 845 psi, with a range of 750-860 psi.

FIG. 23 also shows a plot showing tensile stress of a coined cable tie compared to the prior art. Here, the achieved tensile stress in a coined cable tie is about 845 psi with a range of about 800 to 860 psi, which is somewhat comparable to the prior art. However, the variability of tensile stress provided by a coined cable tie is reduced over that of the prior art.

FIG. 23 also includes data of tensile stress of a cable tie that is coined and that employs an angled head. Here, the achieved tensile stress in a coined cable tie is about 850 psi with a range of about 775 to 880 psi.

Referring to FIGS. 24-34, embodiments of the present invention are made using a manufacturing step that causes the side walls 22 of the buckle 6 to deform outwardly away from the longitudinal axis of the band 14. This deformation alters the shape of the opening 26 making it wider in the lateral direction (perpendicular to the longitudinal axis of the band). The process used to alter the shape of the side walls 22 may slightly deform the leading edge 30 of the band and a portion of the buckle 6 adjacent to the leading edge 30 of the band 14, which reduces the height of the opening 26. It is contemplated that a die is used to plastically deform the head 10 in order to deform the side walls 22.

When the band 14 is accepted within the buckle 6 the side walls 22 will not generally come in contact with the lateral edges of the band 14. Conversely, prior art cable ties have a tight interface between the lateral edges of the band 14 and the side walls 22 of the buckle 6 which may cause burring of the band 14 during tensioning. Burring or other detrimental contact between the band 14 and the buckle 6, and increases the amount of energy required to tension the band 14. In addition, burrs create a foreign object that may cause physical harm. Embodiments of the present invention reduce or eliminate burring by limiting the contact between the side walls 22 and the band 14.

Figure 31:
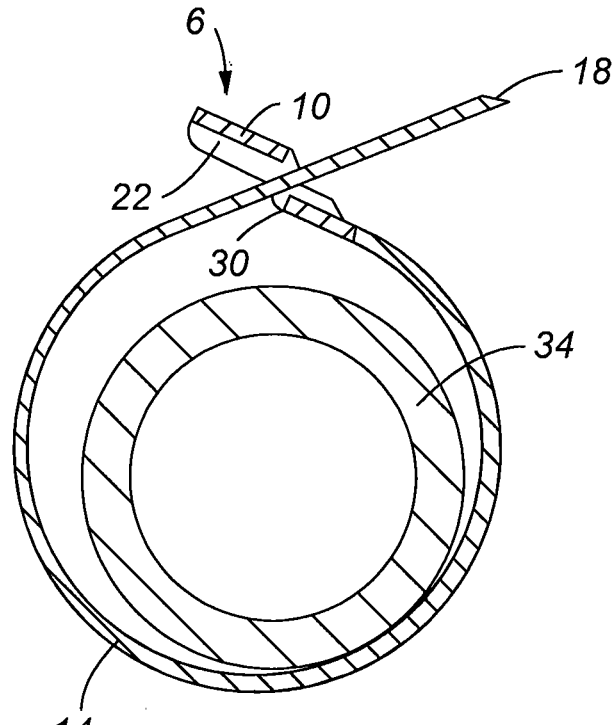
FIG. 31 is a cross sectional view of the cable tie of FIG. 24, shown prior to tensioning around an object.
Figure 32:
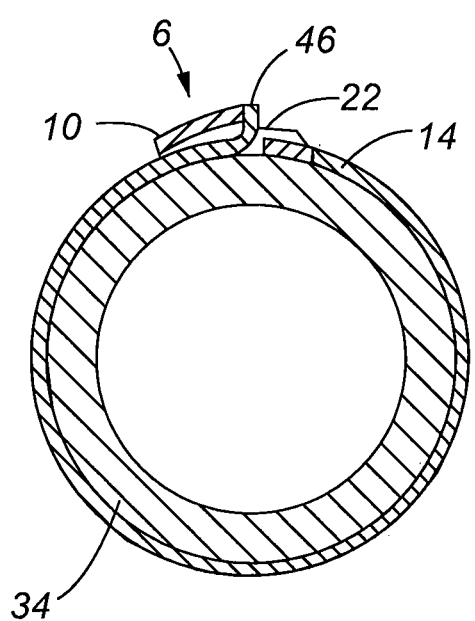
FIG. 32 is a sectional view of the cable tie of FIG. 24, subsequent to tensioning around an object.
Figure 33:
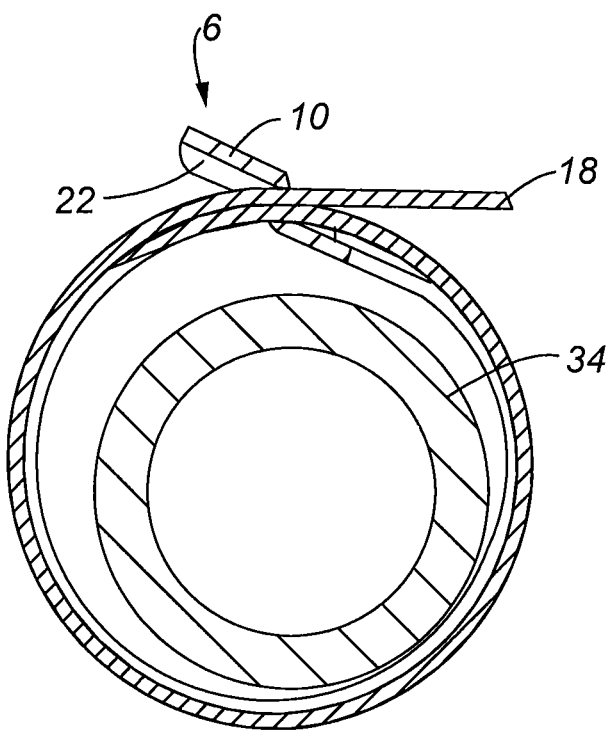
FIG. 33 is a cross-sectional view of the cable tie of FIG. 24 shown in a second mode of use prior to tensioning around an object.
Figure 34:
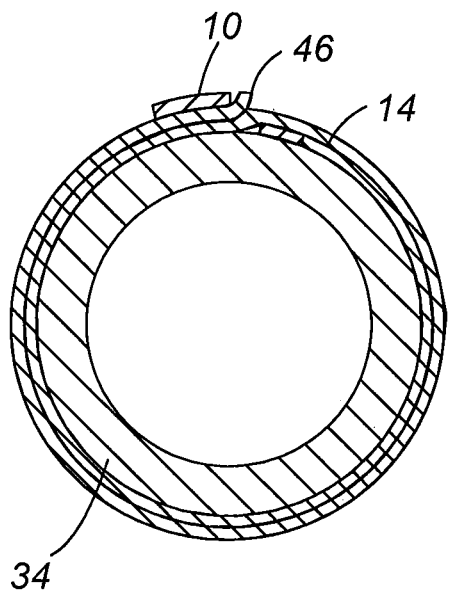
FIG. 34 is a cross-sectional view of the cable tie of FIG. 24 subsequent to tensioning around an object.
Figure 35:
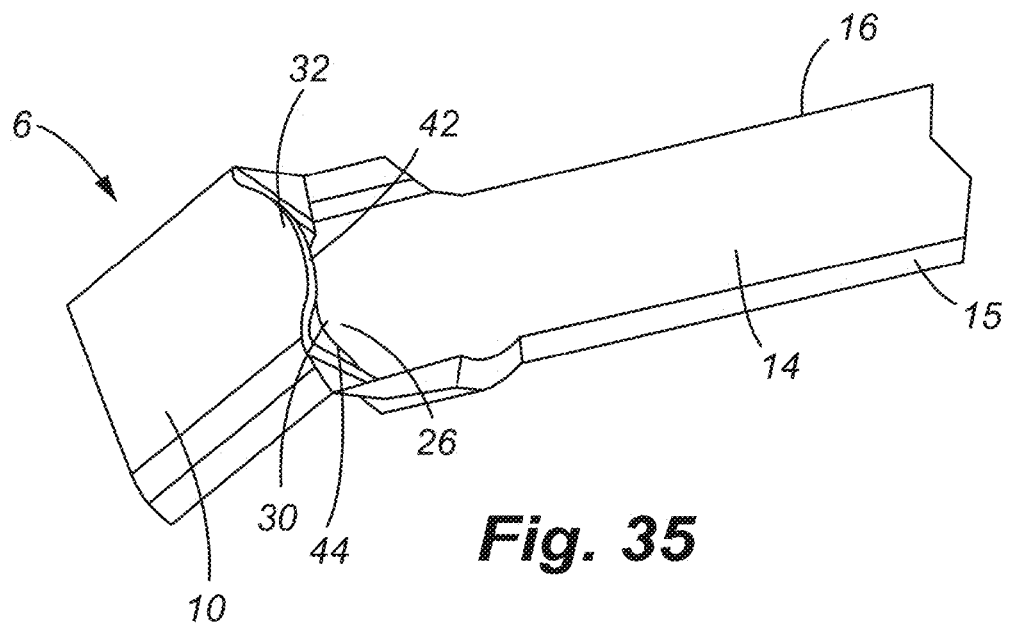
FIG. 35 is a partial front perspective view of a cable tie of another embodiment of the present invention wherein the buckle is angled with respect to a band, a trailing edge of the head includes a bulge, and the leading edge of the band includes a bulge.
Figure 36:
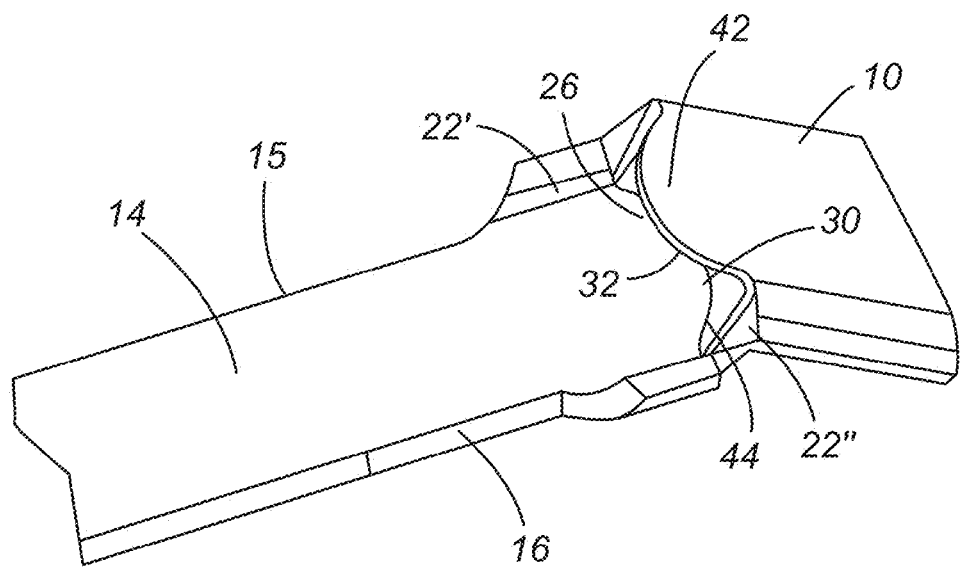
FIG. 36 is a partial rear perspective view of the cable tie shown in FIG. 35.
Figure 37:
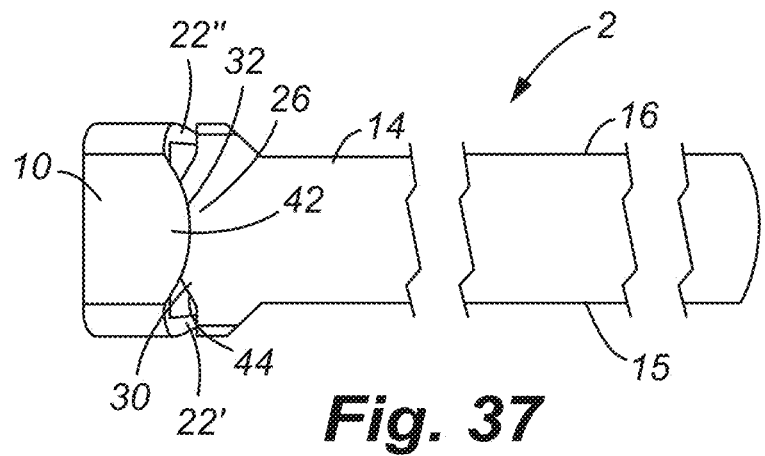
FIG. 37 is a top plan view of the cable tie shown in FIG. 35.
Figure 38:
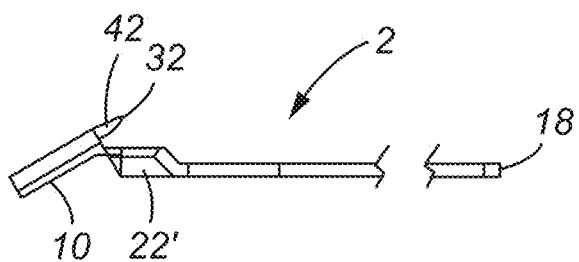
FIG. 38 is a front elevation view of the cable tie shown in FIG. 35.
Figure 39:
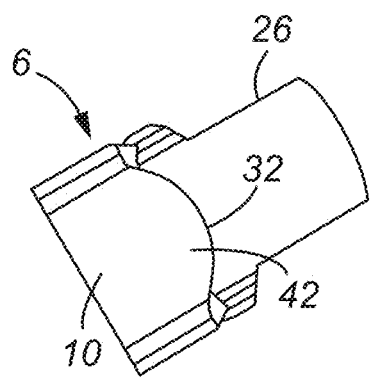
FIG. 39 is an auxiliary view of the cable tie shown in FIG. 38.
Figure 40:
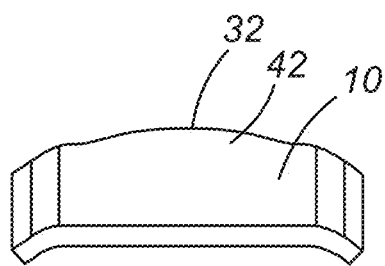
FIG. 40 is a left elevation view of the cable tie shown in FIG. 38.

Referring now to FIGS. 31-34, interconnection of embodiments of the cable tie 2 of the present invention is shown. Here, the band 14 is wrapped around a cable 34, although it should be understood that "cable" could also be a bundle of cables, a tube, or other objects. The tail 18 of the band 14 tie is then placed within the buckle 6 one or more times (FIGS. 31 & 33). After tensioning (FIGS. 32 & 34), a tool bends the band 14 upwardly and the head 10 of the buckle 6 downwardly. The excess portion of the band is severed 46, thereby securing the cable tie about the cable 34 or other object to be secured.

The preferred method of making cable ties of the present invention involves a machining process whereby the amount of metal material utilized is reduced because buckles are formed at alternating ends of bands. In particular, a sheet of metal is provided having a width at least equal to the length of the one-piece cable tie. The machining process includes cutting and stamping steps wherein buckles are formed at opposite sides of the sheet metal. Each buckle at one side of the sheet metal is offset from a corresponding buckle formed at the opposite side of the sheet metal. Consequently, when each band is formed as a result of cutting the sheet material in a direction transverse to the longitudinal extent of the sheet metal, the cable tie is formed with the buckle at one side of the sheet metal and the next cable tie that is formed has its buckle formed at the opposite side of the sheet metal. Hence, the use of all available metal on the sheet material is enhanced and, correspondingly, waste of metal is reduced in making the cable ties. The heads of the cable ties are bent in a separate manufacturing process. In that process, the head and band may be coined. Alternatively, the coining process may be a separate step. The side walls of the cable ties may also be altered in a separate manufacturing process. Alternatively, the side walls may be altered during stamping. One of skill in the art will appreciate that the embodiments described herein may be combined as alluded to above. For example, a cable tie having an angled head, coined head and angled side walls may be provided. Alternatively, a cable tie possessing any two of the features described may be employed.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:
1. A cable tie, comprising:
a band having a first end and a second end and having a first edge and a second edge extending between said first and second ends, said first edge and said second edge defining a first plane;

a buckle integrally formed with said band at the first end of said band, said buckle including a first wall portion extending from said first edge of said band and a second wall portion extended from said second edge of said band, said buckle further including a head portion that extends between said first and second wall portions, said head portion being offset from said first plane and said head portion being spaced from said first end of said band to define an opening for receiving said second end of said band;

wherein said head portion is angled with respect to said first plane; and wherein said head portion of said buckle and said first end of said band possess a bulge.

2. The cable tie of claim 1, wherein said first wall portion and said second wall portion are angled outwardly such that said opening is wider adjacent to said head portion of said buckle than a distance between said first edge and said second edge.

3. The cable tie of claim 1, wherein said angle between said first plane and said head portion is about 30 degrees such that said head portion is angled toward an inner surface of said band.

4. The cable tie of claim 1, wherein said first wall portion and said second wall portion are angled outwardly such that said opening is wider adjacent to said head portion of said buckle than the distance between said first edge and said second edge.

5. The cable tie of claim 1, wherein said bulge comprises an arcuate shape in said head portion and an arcuate shape in said first end of said band.

6. A cable tie, comprising:

a band having a first end and a second end and having a first edge and a second edge extending between said first and second ends, said first edge and said second edge defining a first plane;

a buckle integrally formed with said band at the first end of said band, said buckle including a first wall portion extending from said first edge of said band and a second wall portion extended from said second edge of said band, said buckle further including a head portion that extends between said first and second wall potions, said head portion being offset from said first plane to define an opening for receiving said second end of said band; and wherein said head portion includes a first bulge and said first end of said band includes a second bulge.

7. The cable tie of claim 6, wherein said first bulge comprises an arcuate shape and said second bulge comprises an arcuate shape.

8. A cable tie, comprising:

a band having a first end and a second end and having a first edge and a second edge extending between said first and second ends, said first edge and said second edge defining a first plane;

a buckle integrally formed with said band at the first end of said band, said buckle including a first wall portion extending from said first edge of said band and a second wall portion extended from said second edge of said band, said buckle further including a head portion that extends between said first and second wall portions, said head portion being offset from said first plane and said head portion being spaced from said first end of said band to define an opening for receiving said second end of said band;

wherein said head portion is angled with respect to said first plane; and wherein said first wall portion and said second wall portion are angled outwardly such that said opening is wider adjacent to said head portion of said buckle than a distance between said first edge and said second edge.

9. The cable tie of claim 8 wherein said head portion of said buckle and said first end of said band possess a bulge.

* * * * *